US005255178A

United States Patent [19]

Liberati

[11] Patent Number: 5,255,178
[45] Date of Patent: Oct. 19, 1993

[54] HIGH-FREQUENCY SWITCHING-TYPE PROTECTED POWER SUPPLY, IN PARTICULAR FOR ELECTROSTATIC PRECIPITATORS

[75] Inventor: Guglielmo Liberati, Viareggio, Italy

[73] Assignee: Enel S.p.A., Rome, Italy

[21] Appl. No.: 857,154

[22] Filed: Mar. 25, 1992

[30] Foreign Application Priority Data

Apr. 12, 1991 [IT] Italy ............................ 91 A/000083

[51] Int. Cl.[5] ........................ H02M 5/443; B03C 3/68

[52] U.S. Cl. .......................................... 96/80; 363/37; 363/96; 323/903

[58] Field of Search ........................ 363/17, 28, 37, 96, 363/98, 124, 132, 136, 137; 323/903; 55/105, 139; 361/235

[56] References Cited

U.S. PATENT DOCUMENTS

| | | | |
|---|---|---|---|
| 3,641,740 | 2/1972 | Schumann et al. | 55/105 |
| 4,233,039 | 11/1980 | Schmidt | 55/139 |
| 4,587,475 | 5/1986 | Finney, Jr. et al. | 323/241 |
| 4,600,411 | 7/1986 | Santamaria | 55/139 |
| 4,779,182 | 10/1988 | Mickal et al. | 363/37 |
| 4,909,812 | 3/1990 | Shapenko et al. | 55/139 |

*Primary Examiner*—Steven L. Stephan
*Assistant Examiner*—Adolf Berhane
*Attorney, Agent, or Firm*—Browdy and Neimark

[57] ABSTRACT

A high-frequency, switching-type protected power supply, in particular for electrostatic precipitators, characterized by the fact of comprising a regulated power supply system for providing direct voltage adjusted at a desired value and at a relatively low voltage; a high efficiency, high-frequency switching system driving a step-up voltage transformer until reaching substantially the desired operating voltage of the precipitator, the secondary circuit of which directly feeds, by means of a rectifier group, the electrostatic precipitator. The high-frequency switching system is controlled in its operation in response to abnormalities indicating an incipient discharge between the electrodes of the electrostatic precipitator to modify the operating conditions in order to avoid the formation of disruptive discharges with consequent possible damage to the entire power supply and/or electrostatic precipitator.

9 Claims, 3 Drawing Sheets

HIGH-FREQUENCY SWITCHING-TYPE PROTECTED POWER SUPPLY, IN PARTICULAR FOR ELECTROSTATIC PRECIPITATORS

DESCRIPTION

1. Field of the Invention

The present invention relates to a high-frequency switching-type protected power supply, in particular for electrostatic precipitators, such as precipitators of particles carried over by the smoke of industrial burners.

2. Background Art

The electrostatic precipitator is a system for collecting solid particles which operates by virtue of the movement of charges immersed in an electric field. The smoke, suitably ionized, is made to pass through a zone where an electric field is directed tranversely to the flow. The charged dust particles migrate, under the effect of the electric field, towards collecting plates on which they deposit. A system for shaking the plates causes, at regular intervals, the collected dust to fall into a hopper located below the plates. In its practical embodiment the precipitator is constituted of a series of electrically grounded vertical plates between which electrodes classically constituted of metallic wires of a few millimeters in diameter are placed and maintained at a high negative potential with respect to the plates.

Inside the precipitator, two appreciably different zones, from an electric stand point, can be distinguished. A first zone,near the electrode, is subject to a high intensity electric field where a corona discharge develops, which causes the ionization of the surrounding gas and the binding of the ions to the particles of dust in suspension. The second zone, spaced from the electrode, maintains an electric field of lower intensity which is not sufficient for the ionization of the gas, but is useful for the migration of the charged particles of dust towards the collecting plates.

The potential difference between the electrodes and the plates is maintained by means of high-voltage direct current power supplies.

From an electric stand point, the precipitator can be considered as a non-linear resistance element in parallel to a strong capacitance component.

The current drawn by the precipitator varies as a function of the geometric parameters: it is proportional to the surface area of collection and is a non-linear function of the applied voltage. Furthermore, it depends on the type of smoke, their particle content, the temperature and the operating pressure.

FIG. 1 shows a typical curve characteristic of an electric section of an electrostatic precipitator. The capacitive part has a value equal to several tens of nanofarads (tentatively 50–60 nF) the actual value of which depends on the geometric characteristics of the precipitator (collecting surface and distance between the collecting plates).

A typical field of use of these precipitators is the removal of particles entrained with the smoke emitted from thermal power plants.

A power supply of conventional type mounted on existing electrostatic precipitators is essentially formed by a step-up transformer (see FIG.2) fed by the 50 Hz Power network by means of an SCR partialization system (in old model power supplies the partialization was obtained with a system of saturable inductances). The high voltage present on the secondary circuit of the transformer is rectified by means of a diode bridge and smoothed with an inductance/capicitance filter. The capacitance of the filter is constitued only by the precipitator itself.

A regulation system acts on the partialization of the SCR in order to maintain the desired levels of voltage and/or current on the load.

It should be recognized that, at an experimental level, impulse power supplies have been tested which apply to the precipitator a series of voltage impulses of high value and brief duration (50–100 μs) with a repetition rate (50–400 Hz) overlapping a direct current bias.

These power supplies, still not completely at the industrial stage, seem to allow for greater efficiency in the case of fine particles as well as higher resistivity values of the ashes.

The principal object of the present invention is to provide a high-voltage and relatively high power switching-type power supply, particularly suitable for the use with electrostatic precipitators for the removal of the particles entrained with the smoke emitted from thermal power plants.

A further object of the present invention is to provide a power supply of the above-cited type equipped with means to perceive the triggering, between the electrodes of the precipitator, of disruptive discharge phenomena which can cause serious inconveniences that could lead to the distruction of the high voltage power supply.

SUMMARY OF THE INVENTION

According to the present invention, a high voltage power supply of the type cited is provided which comprises a regulated power supply system for providing a direct voltage adjusted at a desired value and at a relatively low voltage; a high efficiency, high-frequency switching system for driving a step-up voltage transformer until reaching substantially the desired operating voltage of the precipitator, the secondary circuit of which, by means of a rectifier, directly supplies the electrostatic precipitator; the high-frequency switching system being controlled in its operation in response to abnormalities indicating an incipient discharge between the electrodes of the electrostatic precipitator in order to modify the operating conditions with the purpose of avoiding the formation of disruptive discharges and possible consequent damage to the entire power supply and/or the electrostatic precipitator.

BRIEF DESCRIPTION OF THE DRAWINGS

The present invention will now be described in reference to its presently preferred possible embodiments, given as examples, but not limitative, and on the basis of the figures of the attached drawings, in which.

DESCRIPTION OF THE PREFERRED EMBODIMENT

Figure 1:
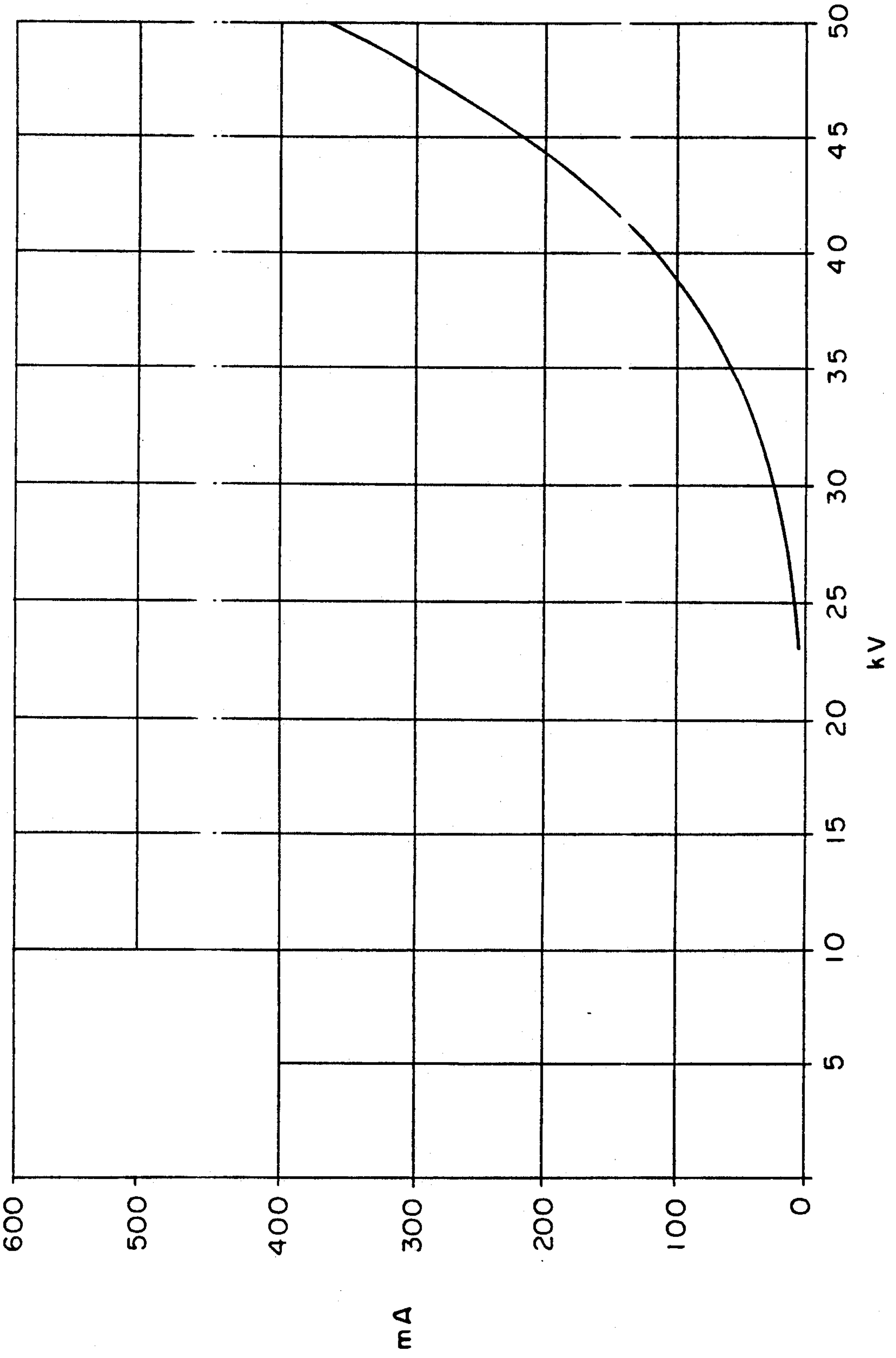
FIG. 1 shows a typical diagram of the current-voltage characteristic in a generic electrostatic precipitator.

With reference now to the drawings, and in particular to FIG. 1 which shows the voltage-current diagram in a typical electrostatic precipitator, it can be seen that the curve descriptive of the pattern is of a parabolic type, and that beyond a certain difference in the voltage between the electrodes, there is an extremely rapid increase in the current through them, until arriving at a disruptive discharge (not shown).

The curve shown in FIG. 1 is clearly of a theoretic type, since in practical operation numerous parameters which are unforeseeable a priori intervene and can cause disruptive discharges even in the zone with a smooth pattern shown in the right-hand part of the graph in FIG. 1.

Said disruptive discharges are produced by streamers of the start of abnormal ionization which leads to the formation of an arc, which having current-voltage characteristics of a negative resistance type leads to the passage of current of uncontrolled intensity which can lead to the distruction of the high voltage power supply if no intervention is taken to cut out the power supply, and, in the long run, to the damage of the structure of the electrodes of the electrostatic precipitator.

To this it must be added that in conventional electrostatic precipitators supplied at 50 Hz the response time of a known-type power supply is on the order of $10^{-2}$ seconds in so far as it relates to a system operating at power frequency and controlled by SCR which, as known, once triggered, can only be turned off at the moment when the current which crosses them is at zero.

With the use according to the invention of a non regenerative active elements in the power supply such as bipolar transistors or better MOSFET transistors and with the use of high switching frequencies, a faster response time of some orders is obtained.

Figure 2:
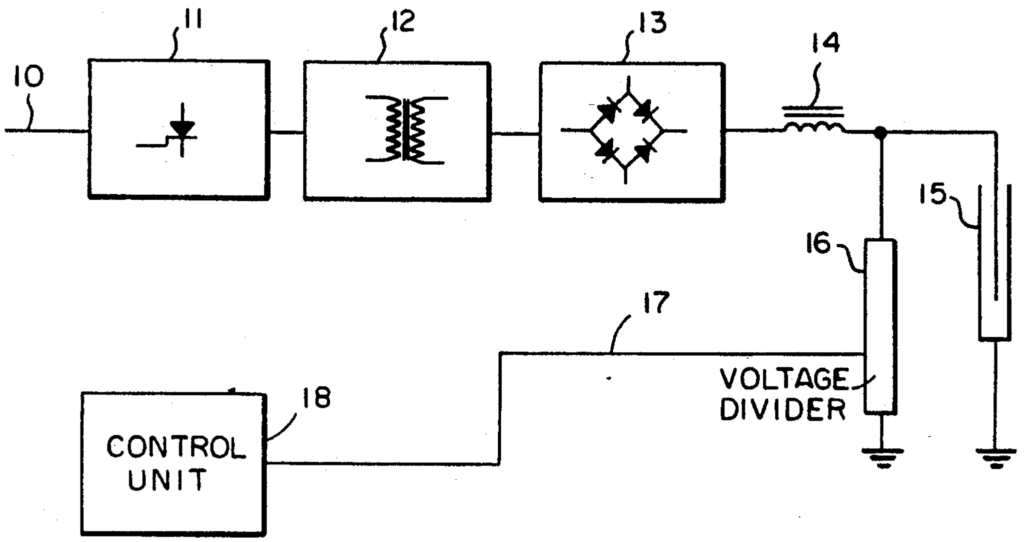
FIG.2 PRIOR ART
FIG. 2 shows schematically the general architecture of a power supply for electrostatic precipitators according to the prior art.

FIG. 2 shows the structure according to the prior art, in which the starting point is a network power supply 10, which is partialized to one or two half-waves by means of an SCR group of a known type, which drives a voltage transformer 12, connected to a rectifier 13 followed by a filter inductance 14 the output of which is connected to the electrostatic precipitator generally indicated at 15.

On the output of the filter 14, a voltage divider 16 having an output 17 is placed, to perform a voltmetric measurement of the voltage present in the terminals of the precipitator 15. The signal present in the output 17 is brought to a control unit 18 which commands in a known way the SCR unit 11 in the sense of stabilizing the output voltage and cutting off the SCR drive in the case of a short circuit or a disruptive discharge inside the precipitator.

Figure 3:
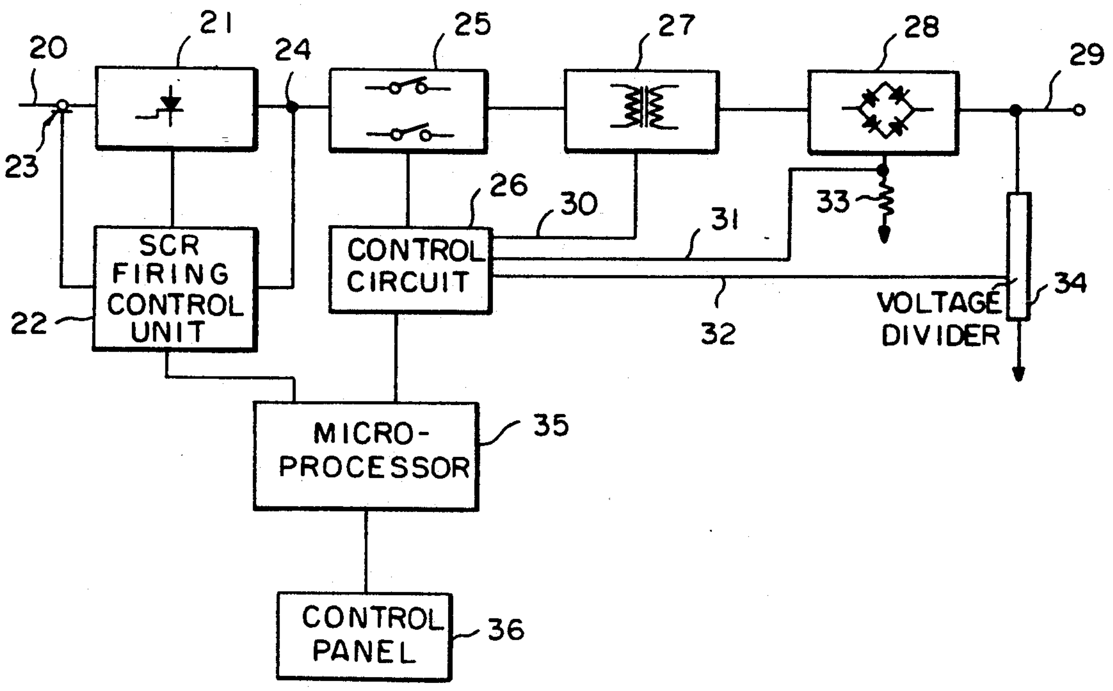
FIG. 3 shows the general block diagram of the high voltage power supply according to the present invention.

FIG. 3 shows the general block diagram of the structure according to the present invention.

From the power supply network 20, an SCR ac-dc convertor 21 is supplied under the control of a firing control circuit 22 with a current and voltage protection respectively schematically shown in 23, 24. The structure of the unit 22 is substantially conventional and will not be described in detail. The output of the group 21 feeds a switching group, with non-regenerative active elements such as transistors, generally shown in 25, which is driven at a prefixed operating frequency 50–100 kHz by a control circuit 26. The unit 25 drives a step-up voltage transformer 27, to which is connected a rectifer, for instance of a Graetz bridge type, to which is connected the "hot" terminal of an electrostatic precipitator not shown.

Three signals indicated in 30, 31, 32 reach the control circuit 22. The signal 30 comes from the transformer 27 to signal the circuit 26 of the possible incipient saturation of the ferromagnetic or ferrimagnetic core of the transformer 27 and therefore to reduce the drive of the switching elements 25. The signal 31 is a signal for the monitoring of the current delivered by the rectifier 28, and constituted of a voltage obtained from a current sensing resistor 33 located on the return arm of the rectifier 28. The signal 32 is proportional to the voltage on the output 29 obtained by means of a voltage divider 34 similar to the divider 16 in FIG. 2.

The units 22 and 26 are under the control of a microprocessor unit 35 associated with a control panel 36, with a conventional structure which will not be illustrated in detail.

Figure 4:
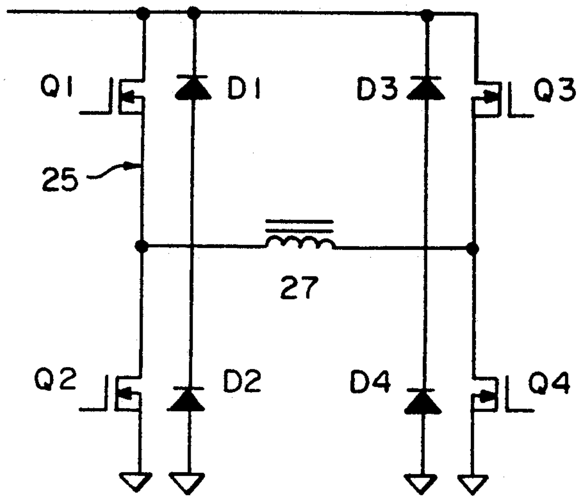
FIG. 4 shows a preferred embodiment of the high-frequency switch of the power supply in question.

FIG. 4 shows one of the possible embodiments of the unit 25 of FIG. 3. It comprises four transistors in groups of paralleled transistors of a MOSFET type Q1, Q2, Q3, Q4, in a double "totem-pole" configuration which drives the primary of the transformer 27. The circuit is completed by diodes D1, D2, D3, D4. The use of MOSFET power transistors is preferred in that this type of transistor is easily paralleled, has short response times and does not present problems in the matching of the VBE of the bipolar transistors.

Figure 5:
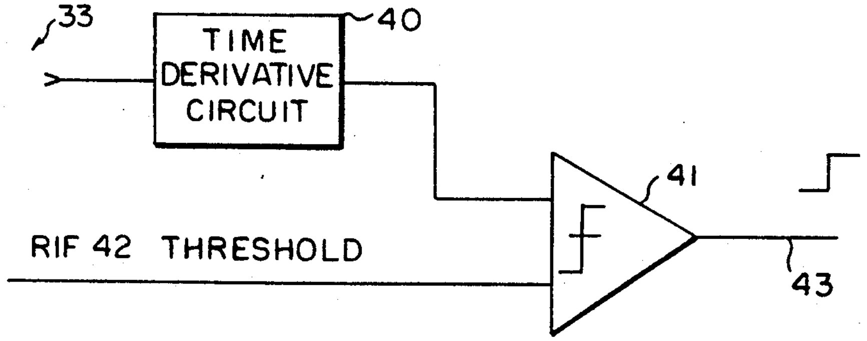
FIG. 5 shows schematically a first embodiment of the protection circuitry.
Figure 6:
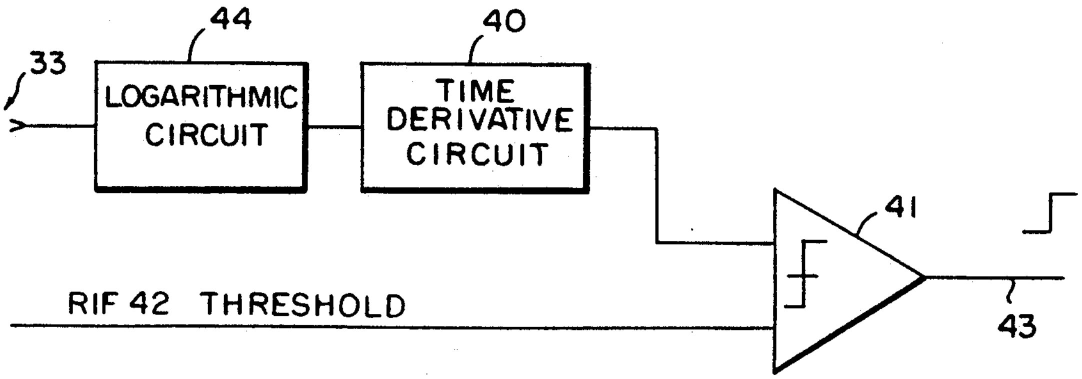
FIG. 6 shows schematically a second embodiment of the protection circuitry.

Shown in FIGS. 5 and 6 are two auxiliary circuits to improve the operation of the circuitry shown in FIG. 3.

The circuits in FIGS. 5 and 6 are placed in the power line 32 of FIG. 3 which measures the current delivered from the rectifier 28.

As previously stated, the beginning of a discharge is accompanied by fluctuations in current. These can be revealed, as shown in FIG. 5, by a differentiating network time derivative circuit 40 connected to the current sensing resistor 33, the output of which is connected to a first input of a comparator 41, the other input of which is connected to a reference voltage 42. In the presence of said fluctuations in current which report a close-at-hand occurance of a discharge in the precipitator, if they exceed a pre-established threshold value 42, the comparator 41 will produce a voltage impulse on its output 43 which will operate either to reduce the output voltage on the terminal 29 (FIG. 3) or to annul it in order to avoid the above described inconveniences.

In FIG. 6, where components similar to those in FIG. 5 are indicated with the same reference numbers, before the differentiating network time derivative circuit 40, a logarithmic circuit 44 is interposed in order to realize the function $$\frac{1}{i} \cdot \frac{di}{dt} = \frac{d}{dt} \ln(i) > \text{threshold}$$

so that the comparison is carried out on the percentage variation of the current drawn by the precipitator.

It is clear to an expert in the field that the transfer function of the entire servo of control of voltage, current, variations in current, etc. must be realized in such a way as to have sufficient stability margins to assure the correct operation of the system.

The transfer operation can therefore be implemented with classical methods of a similar type, or synthesized for instance by means of a microprocessor included in the block 35 of FIG. 3.

This deals, in any case, with well known techniques which will not be illustrated in detail for the sake of brevity.

The present invention has been described in reference to one of its possible and currently preferred embodiments, given as an example but not limitative, and with the understanding that variations and modifications can be made at a practical level by an expert in the field without departing from the scope of the invention itself.

I claim:

1. A high-frequency switching-type protected power supply, in particular for electrostatic precipitators, comprising a regulated power supply means for providing direct voltage adjusted at a desired value and at a relatively low voltage;

a high efficiency, high frequency switching means connected to said regulated power supply means;

a step-up voltage transformer driven by said switching means until reaching substantially the desired operating voltage of the electrostatic precipitators;

a rectifier means feeding the electrostatic precipitators and connected to said step-up voltage transformer;

control circuit means connected to said high frequency switching means to control said switching means in response to abnormalities indicating an incipient discharge between electrostatic precipitator electrodes to modify the operating conditions in order to avoid the formation of disruptive discharges with consequent damage to power supply or electrostatic precipitators;

and means to signal possible incipient saturation of a core of said step-up voltage transformer connected to said control circuit means.

2. The power supply in accordance with claim 1 wherein said core of said step-up voltage transformer is a ferromagnetic core.

3. The power supply in accordance with claim 1 wherein said core of said stp-up voltage transformer is a ferrimagnetic core.

4. The power supply in accordance with claim 1 wherein current sensing resistive means is connected to said rectifier means;

a differentiating network is connected to receive a signal from said current sensing resistive means for the perception of variations in current indicative of operational abnormalities;

a comparison means connected to receive an output of said differentiating network and a threshold value signal and to generate a control signal when said threshold value signal is exceeded.

5. The power supply in accordance with claim 4 wherein a logarithmic circuit is connected to feed an output to said differentiating network.

6. The power supply in accordance with claim 4 wherein said high frequency switching means is constituted of non-regenerative semi-conductor active elements.

7. The power supply in accordance with claim 6 wherein said active elements are MOSFET type transistors.

8. The power supply in accordance with claim 7 wherein said transistors are placed in a double totem-pole configuration.

9. A high-frequency switching-type protected power supply, in particular for electrostatic precipitators, comprising a regulated power supply means for providing direct voltage adjusted at a desired value and at a relatively low voltage;

a high efficiency, high frequency switching means connected to said regulated power supply means;

a step-up voltage transformer driven by said switching means until reaching substantially the desired operating voltage of the electrostatic precipitators;

a rectifier means feeding the electrostatic precipitators and connected to said step-up voltage transformer;

control circuit means connected to said high frequency switching means to drive said switching means at a prefixed operating frequency in the range of 50 to 100 kHz and to control said switching means in response to abnormalities indicating an incipient discharge between electrostatic precipitator electrodes to modify the operating conditions in order to avoid the formation of disruptive discharges with consequent damage to power supply or electrostatic precipitators;

and means to signal possible incipient saturation of a core of said step-up voltage transformer connected to said control circuit means.

* * * * *